US012532037B2

(12) United States Patent
Sun

(10) Patent No.: US 12,532,037 B2
(45) Date of Patent: Jan. 20, 2026

(54) LIVE STREAMING OBJECT RECOMMENDATION METHOD AND APPARATUS, DEVICE, MEDIUM AND PRODUCT

(71) Applicant: Beijing Youzhuju Network Technology Co., Ltd., Beijing (CN)

(72) Inventor: Beijia Sun, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/786,143

(22) Filed: Jul. 26, 2024

(65) Prior Publication Data

US 2024/0388741 A1 Nov. 21, 2024

Related U.S. Application Data

(63) Continuation of application No. PCT/CN2023/087442, filed on Apr. 11, 2023.

(30) Foreign Application Priority Data

Apr. 20, 2022 (CN) .......................... 202210416211.8

(51) Int. Cl.
*H04N 21/2187* (2011.01)
*H04N 21/466* (2011.01)

(52) U.S. Cl.
CPC ..... *H04N 21/2187* (2013.01); *H04N 21/4668* (2013.01)

(58) Field of Classification Search
CPC .................. H04N 21/2187; H04N 21/4668
See application file for complete search history.

(56) References Cited

U.S. PATENT DOCUMENTS

| 2016/0147892 A1 | 5/2016 | Gilbert et al. |
| 2023/0063711 A1* | 3/2023 | Liu ...................... G06Q 10/087 |
| 2023/0186366 A1* | 6/2023 | Vaidyanathan .... G06Q 30/0631 |
| | | 705/26.7 |

FOREIGN PATENT DOCUMENTS

| CN | 109358795 A | * | 2/2019 |
| CN | 112399200 A | * | 2/2021 | ........... H04N 21/251 |
| CN | 113254136 A | | 8/2021 |
| CN | 113608650 A | | 11/2021 |
| CN | 113608651 A | | 11/2021 |

(Continued)

OTHER PUBLICATIONS

English translation of CN-112399200 A (Year: 2021).*

(Continued)

*Primary Examiner* — Gigi L Dubasky
(74) *Attorney, Agent, or Firm* — Alleman Hall & Tuttle LLP

(57) ABSTRACT

The present disclosure provides a recommendation method and apparatus, a device, a medium and a product, and relates to the technical field of computers. The method includes: in a case where objects to be presented corresponding to a live streaming page satisfy a first preset condition, presenting, in the live streaming page, an interaction control corresponding to the objects to be presented; and in response to a first operation for the interaction control, presenting a recommendation sub-page in the live streaming page, where the recommendation sub-page is used for presenting a recommended object corresponding to the objects to be presented.

18 Claims, 9 Drawing Sheets

(56) References Cited

FOREIGN PATENT DOCUMENTS

| CN | 113613055 | A  |   | 11/2021 |              |
|----|-----------|----|---|---------|--------------|
| CN | 115988228 | A  | * | 4/2023  |              |
| CN | 114125530 | B  | * | 2/2024  | H04N 21/2187 |
| JP | 6995553   | B2 | * | 1/2022  |              |

OTHER PUBLICATIONS

English translation of CN-109358795 A (Year: 2019).*
English translation of JP-6995553 B2 (Year: 2022).*
English version of CN 114125530 B, Wang, Yi-tian, Feb. 23, 2024 (Year: 2024).*
English translation version of CN 115988228 A (Year: 2023).*
ISA China National Intellectual Property Administration, International Search Report Issued in Application No. PCT/CN2023/087442, Jun. 20, 2023, WIPO, 3 pages.
China National Intellectual Property Administration, First Office Action for Chinese Application No. 202210416211.8, mailed on Nov. 7, 2024, 18 pages.

* cited by examiner

LIVE STREAMING OBJECT RECOMMENDATION METHOD AND APPARATUS, DEVICE, MEDIUM AND PRODUCT

CROSS-REFERENCE TO RELATED APPLICATION(S)

This application is a Continuation Application of International Patent Application No. PCT/CN2023/087442, filed on Apr. 11, 2023, which claims priority to Chinese Application No. 202210416211.8, filed in the China Patent Office on Apr. 20, 2022, and entitled "Recommendation Method and Apparatus, Device, Medium and Product", the disclosures of which are incorporated herein by reference in their entireties.

FIELD

The present disclosure relates to the technical field of computers, and in particular to a recommendation method and apparatus, a device, a computer-readable storage medium and a computer program product.

BACKGROUND

With the continuous development of computer technologies, especially a mobile Internet technology, a live streaming application (APP) is born at the right moment. The live streaming application may be installed in an electronic device such as a mobile phone, and on this basis, a live streamer may record a video based on the live streaming application in the mobile phone, the mobile phone of the live streamer sends the video to a live streaming platform in the form of a video stream, and then the live streaming platform may push the video stream to a mobile phone of a viewer (e.g., a user), and the user may view, in the mobile phone of the user, the video recorded by the live streamer.

During a live streaming process, the live streamer may recommend a commodity to the user, that is, live streaming marketing. At present, the user may only view, in a live streaming room, the commodity recommended by the live streamer, but cannot obtain, in the live streaming room, information of another commodity associated with the commodity, for example, a sales volume, a ranking and the like of the other commodity. When the user needs to acquire the information of the other commodity, the user needs to exit the live streaming room at first, and then executes the step of acquiring the information of the other commodity.

It can be seen that the process of the user for acquiring the information of the other commodity is tedious, such that it is difficult to meet the requirements of the user, and the user experience is worse.

SUMMARY

The objective of the present disclosure is to provide a recommendation method and apparatus, device, a computer-readable storage medium and a computer program product, which may meet user requirements and improve user experience.

In a first aspect, the present disclosure provides a recommendation method, including: in a case where objects to be presented corresponding to a live streaming page satisfy a first preset condition, presenting, in the live streaming page, an interaction control corresponding to the objects to be presented; and in response to a first operation for the interaction control, presenting a recommendation sub-page in the live streaming page, wherein the recommendation sub-page is used for presenting a recommended object corresponding to the objects to be presented.

In a second aspect, the present disclosure provides a recommendation apparatus, including: a presenting module, configured to: in a case where objects to be presented corresponding to a live streaming page satisfy a first preset condition, present, in the live streaming page, an interaction control corresponding to the objects to be presented; and a response module, configured to: in response to a first operation for the interaction control, present a recommendation sub-page in the live streaming page, wherein the recommendation sub-page is used for presenting a recommended object corresponding to the objects to be presented.

In a third aspect, the present disclosure provides an electronic device, including: a storage apparatus, storing a computer program thereon; and a processing apparatus, configured to execute the computer program in the storage apparatus, so as to implement the steps of the method in any one of the first aspect.

In a fourth aspect, the present disclosure provides a computer-readable storage medium, storing a computer program thereon, wherein the program implements, when executed by a processing apparatus, the steps of the method in any one of the first aspect.

In a fifth aspect, the present disclosure provides a computer program product, including an instruction, wherein when the computer program product is running on a device, the device is caused to execute the steps of the method in any one of the first aspect.

It can be seen from the above technical solutions that the present disclosure has the following advantages:

The present disclosure provides a recommendation method. In the method, in a case where the objects to be presented corresponding to the live streaming page satisfy the first preset condition, the interaction control corresponding to the objects to be presented is presented in the live streaming page; then a user may trigger the first operation for the interaction control to view the recommended object corresponding to the objects to be presented; and next, in response to the first operation for the interaction control, the recommendation sub-page is presented in the live streaming page, and the recommended object corresponding to the objects to be presented is presented in the recommendation sub-page. In this way, the user may view the recommended object associated with the objects to be presented during the process of viewing a live stream, and there is no need for the user to exit a live streaming room and then search for the recommended objects, thereby simplifying user operations, satisfying user requirements, and improving user experience.

Other features and advantages of the present disclosure will be described in detail in the following Detailed Description of Embodiments.

BRIEF DESCRIPTION OF THE DRAWINGS

In order to more clearly illustrate the technical methods of the embodiments of the present disclosure, the drawings required in the embodiments will be briefly described below.

DETAILED DESCRIPTION OF EMBODIMENTS

Figure 1:
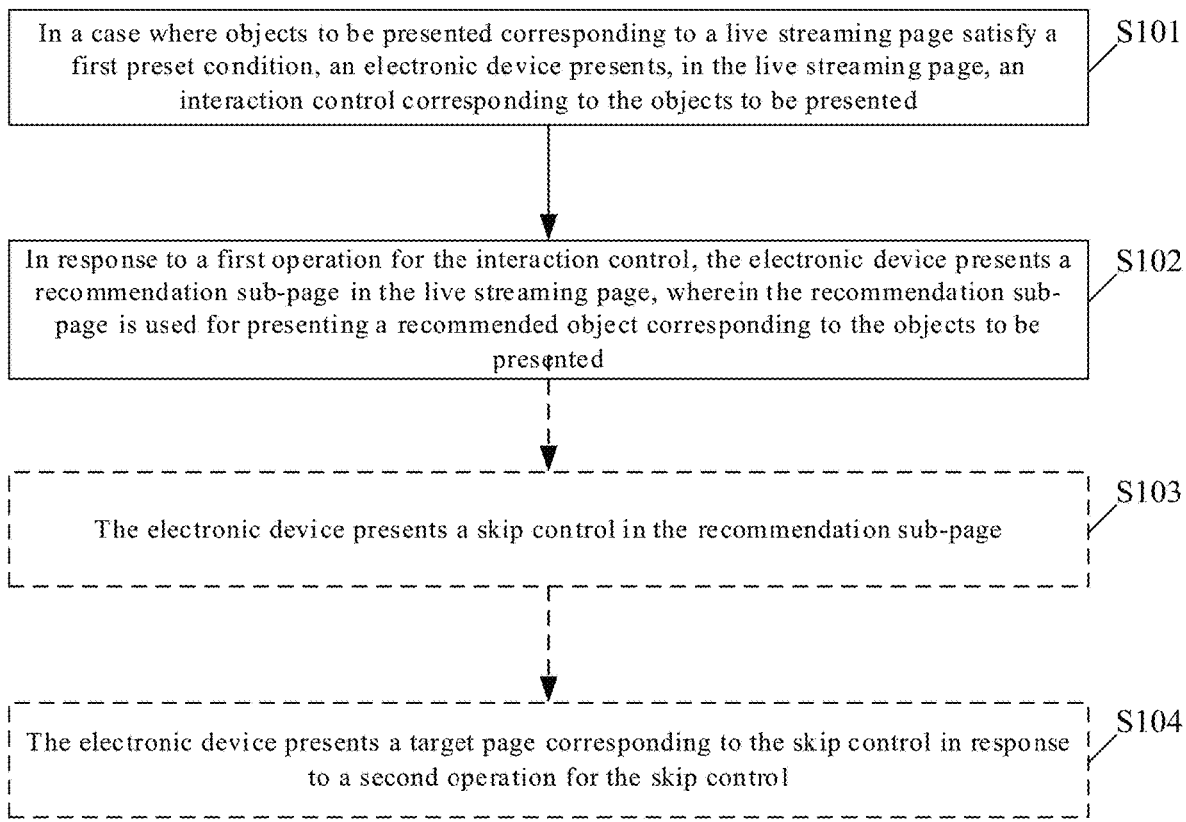
FIG. 1 is a flowchart of a recommendation method provided in an embodiment of the present disclosure.

The terms "first" and "second" in the embodiments of the present disclosure are used for descriptive purposes only and cannot be understood as indicating or implying relative importance or implicitly indicating the number of indicated technical features. Thus, the features defined with "first" and "second" may explicitly or implicitly include one or more of the features.

First, some technical terms involved in the embodiments of the present disclosure are introduced.

An object to be presented refers to an on-sale object of a live streaming room, such as on-sale commodities. In general, the on-sale commodities may include two kinds of commodities, a first kind of commodities may be an in-explanation commodity, and a second kind of commodities may be non-in-explanation commodities. For the above two kinds of commodities, the user may add the on-sale commodities to his/her own shopping cart to realize relatively convenient shopping.

At present, the user may only learn about the on-sale commodities in the live streaming room. For example, in a process that a live streamer explains the first part of commodities, the user may obtain information of the first kind of commodities; and the user may also click on an on-sale control on a live streaming page, so as to learn about information of the second kind of commodities in the on-sale commodities.

However, the user cannot obtain information of other merchandise associated with the on-sale commodities. If the user wants to learn about the other commodities, the user needs to exit the live streaming room, and then search for the other commodities, for example, search for an online mall for the other commodities. It can be seen that the operations of the user are relatively complex, it is difficult to meet the requirements of the user, and the user experience is worse.

In view of this, the present disclosure provides a recommendation method, which may be executed by an electronic device. The electronic device includes, but is not limited to, a smart phone, a tablet computer, a notebook computer, a personal digital assistant (PDA), etc. Specifically, the method includes: in a case where objects to be presented corresponding to a live streaming page satisfy a first preset condition, presenting by the electronic device, in the live streaming page, an interaction control of the objects to be presented; and then, in response to a first operation for the interaction control, presenting by the electronic device a recommendation sub-page in the live streaming page, wherein the recommendation sub-page is used for presenting a recommended object corresponding to the objects to be presented.

In the method, during the process of viewing a live stream, the user may view, in the recommendation sub-page of the live streaming page, the recommended object associated with the objects to be presented by triggering the first operation via the interaction control. It can be seen that there is no need for the user to exit the live streaming room and then search for the recommended object, thereby simplifying user operations, meeting user requirements and improving the user experience.

The method may be applied to a live streaming system. In a case where the method is applied to the live streaming system, the method may be implemented in the form of a computer program. In some embodiments, the computer program may be independent, for example, may be an independent application (e.g., a live streaming APP) having a corresponding function. In some other embodiments, the computer program may be a functional module, a plug-in, and the like, which is attached to an existing APP for running.

In order to make the technical solutions of the present disclosure clearer and understandable, the recommendation method provided in the embodiments of the present disclosure will be described below in combination with the drawings. FIG. 1 is a flowchart of a recommendation method provided in an embodiment of the present application, and the method includes the following:

S101: in a case where objects to be presented corresponding to a live streaming page satisfy a first preset condition, an electronic device presents, in the live streaming page, an interaction control corresponding to the objects to be presented.

The live streaming page refers to a page where the electronic device plays a video stream of a live streamer. For example, during a live streaming process of the live streamer, the video stream of the live streamer is pushed to the electronic device of the user by a live streaming platform, the electronic device may play the video stream of the live streamer, and a page corresponding to the video stream of the live streamer played by the electronic device is the live streaming page. During the live streaming process, the live streamer may introduce on-sale commodities in the live streaming room. An on-sale commodity which the live streamer is introducing may be an in-explanation commodity, so that the user can quickly and conveniently learn about information of the in-explanation commodity; and an on-sale commodity which the live streamer is not introducing may be a non-in-explanation commodity, and the user may also learn about the information of the non-in-explanation commodity by an on-sale control. The objects to be presented corresponding to the live streaming page may be the on-sale commodities of the live streaming room.

Figure 2A:
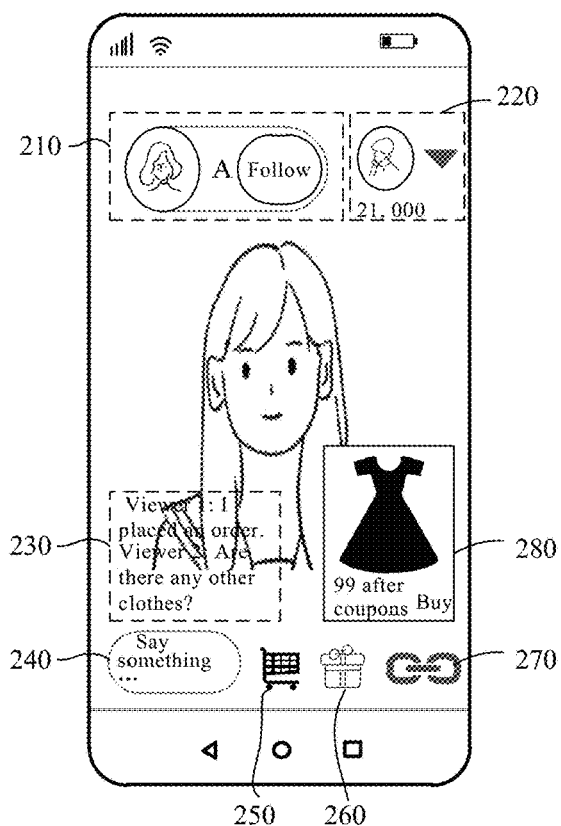
FIG. 2A is a schematic diagram of a live streaming page provided in an embodiment of the present disclosure.

FIG. 2A is a schematic diagram of a live streaming page provided in an embodiment of the present disclosure. The live streaming page may include live streamer information 210, viewer information 220, a bullet comment area 230, a comment area 240, a shopping cart 250, a gift control 260, an on-sale control 270, an in-explanation commodity 280, and the like. The live streamer information 210 includes a live streamer head portrait and a live streamer name. The viewer information 220 includes a viewer head portrait. The bullet comment area 230 is used for presenting bullet comments sent by a viewer. The comment area 240 is used for performing interaction with the live streamer, for example, sending a bullet comment. The shopping cart 250 is used for viewing a commodity that the user selects for purchasing. The gift control 260 is used for sending a virtual item to the live streamer. The on-sale control 270 is used for viewing on-sale commodities corresponding to the present live streaming page. The in-explanation commodity 280 may be an on-sale commodity which the live streamer is explaining, and the user may deeply learn about the commodity based on the explanation of the commodity by the live streamer.

In some examples, the first preset condition may be that the proportion and/or the number of objects to be presented belonging to the same category in the objects to be presented corresponding to the live streaming page is greater than a first preset threshold value. As described above, the objects to be presented may be the on-sale commodities in the live streaming room. For example, the on-sale commodities in the live streaming room may include a commodity 1, a commodity 2 . . . a commodity 10, the commodity 1 and the commodity 2 belong to a men's wear category, and the commodity 3 to the commodity 10 belongs to a women's wear category.

For example, in a case where the proportion of on-sale commodities belonging to the women's wear category in the on-sale commodities corresponding to the live streaming page is greater than the first preset threshold value, the on-sale commodities corresponding to the live streaming page satisfy the first preset condition. The first preset threshold may be a proportion threshold value, for example, the proportion threshold value may be 70%. Of course, in a case where the proportion of on-sale commodities belonging to the men's wear category is greater than the first preset threshold value, the on-sale commodities corresponding to the live streaming page also satisfy the first preset condition.

It should be noted that the above proportion threshold value is merely an exemplary introduction, and those skilled in the art may adjust the proportion threshold value according to actual needs, for example, set the proportion threshold value as 60%, 80%, etc.

As another example, in a case where the number of on-sale commodities belonging to the women's wear category in the on-sale commodities corresponding to the live streaming page is greater than the first preset threshold value, the on-sale commodities corresponding to the live streaming page satisfy the first preset condition, and the first preset threshold may be a number threshold value, for example, the number threshold value may be 5.

It should be noted that the above number threshold value is merely an exemplary introduction, and those skilled in the art may adjust the number threshold value according to actual needs, for example, set the number threshold value as 6, 7, 8, etc.

As another example, in a case where the proportion of the on-sale commodities belonging to the women's wear category in the on-sale commodities corresponding to the live streaming page is greater than the proportion threshold value, and the number of the on-sale commodities belonging to the women's wear category in the on-sale commodities corresponding to the live streaming page is greater than the number threshold value, then the on-sale commodities corresponding to the live streaming page satisfy the first preset condition.

It should be noted that, the first preset threshold value is not specifically limited in the embodiments of the present disclosure, and those skilled in the art may set the first preset threshold value according to actual needs.

In some other examples, the first preset condition may be divided into two sub-conditions. A first sub-condition may be that the proportion and/or number of objects to be presented belonging to the same category in the objects to be presented corresponding to the live streaming page is greater than a first preset threshold value; and a second sub-condition may be that the number of the objects to be presented corresponding to the live streaming page is greater than a second preset threshold value. On the basis, the objects to be presented corresponding to the live streaming page need to satisfy the two sub-conditions, and the electronic device determines that the objects to be presented satisfy the first preset condition. For example, in a case where the proportion of on-sale commodities belonging to the same category in the on-sale commodities corresponding to the live streaming page is greater than the first preset threshold value (satisfying the first sub-condition), and the number of the on-sale commodities corresponding to the live streaming page is greater than the second preset threshold value (satisfying the second sub-condition), then the on-sale commodities corresponding to the live streaming page satisfy the first preset condition. The second preset threshold value may be 5.

It should be noted that the second preset threshold value is merely an exemplary introduction, and those skilled in the art may adjust the second preset threshold value according to actual needs, for example, set the number threshold value as 6, 7, 8, etc.

In the embodiments of the present disclosure, the sequence of determinations for the first sub-condition and the second sub-condition is not specifically limited, for example, whether the first sub-condition is satisfied may be determined at first, and then whether the second sub-condition is satisfied is determined; or, whether the second sub-condition is satisfied may be determined at first, and then whether the first sub-condition is satisfied is determined; or, whether the first sub-condition and the second sub-condition are satisfied may also be determined at the same time.

It should be noted that, during the process of determining whether the two sub-conditions are satisfied, if any one of the sub-conditions is not satisfied, the other sub-condition is no longer determined, so that the waste of computing resources can be reduced. For example, when it is determined that the first sub-condition is not satisfied, whether the second sub-condition is satisfied is no longer determined.

Figure 2B:
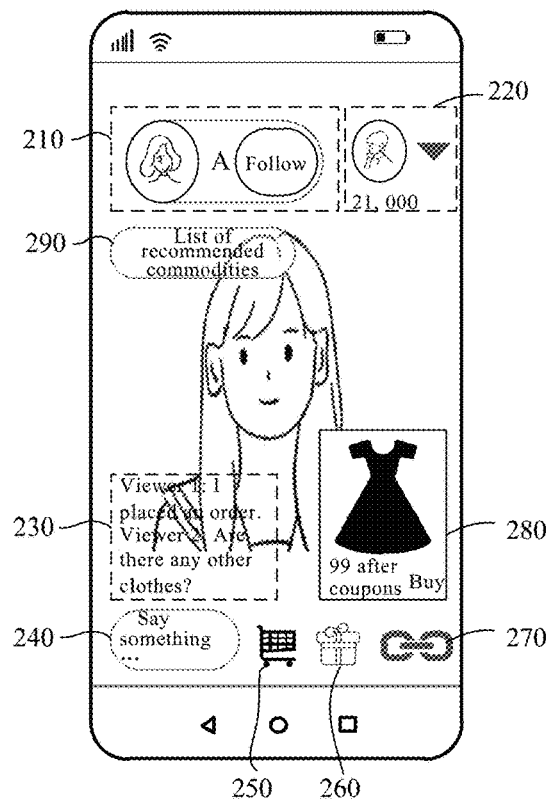
FIG. 2B is a schematic diagram of another live streaming page provided in an embodiment of the present disclosure.

In a case where the objects to be presented corresponding to the live streaming page satisfy the first preset condition, the electronic device presents, in the live streaming page, an interaction control corresponding to the objects to be presented. As shown in FIG. 2B, it is a schematic diagram of another live streaming page provided in an embodiment of the present disclosure. An interaction control 290 may be located below the live streamer information 210. In some other embodiments, the interaction control 290 may also be located below the viewer information 220, above the bullet comment area 230, above the in-explanation commodity 280, and the like. In the embodiments of the present disclosure, the position of the interaction control 290 in the live streaming page is not limited, and FIG. 2B is merely an exemplary introduction.

Figure 2C:
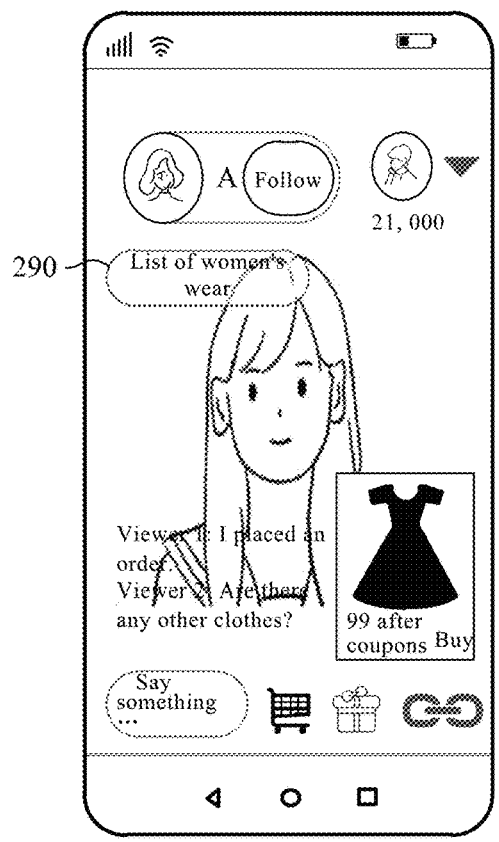
FIG. 2C is a schematic diagram of still another live streaming page provided in an embodiment of the present disclosure.

In some embodiments, the electronic device may also determine that the category corresponding to the objects to be presented belonging to the same category as a target category. For example, in a case where the objects to be presented belonging to the women's wear category satisfy the first preset condition, the women's wear category is used as the target category. Then, the electronic device may present the interaction control of the target category in the live streaming page. As shown in FIG. 2C, it is a schematic diagram of still another live streaming page provided in an embodiment of the present disclosure. The electronic device may present, in the live streaming page, the interaction control 290 corresponding to the women's wear category.

Figure 2D:
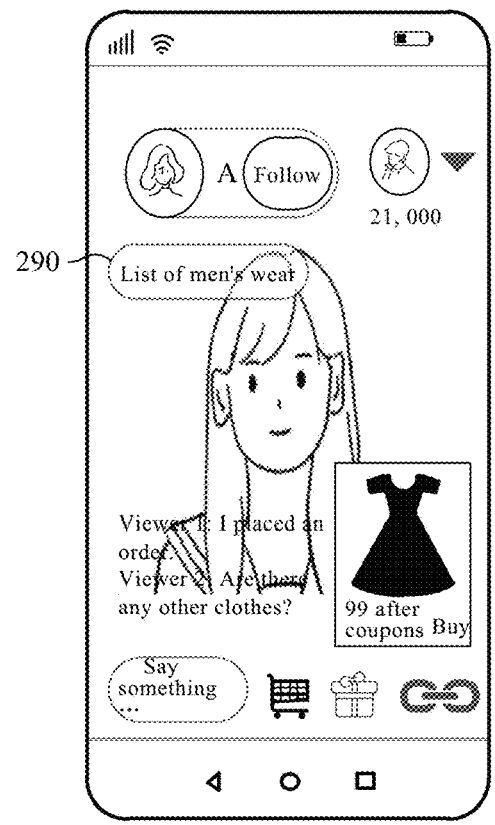
FIG. 2D is a schematic diagram of still another live streaming page provided in an embodiment of the present disclosure.

As shown in FIG. 2D, it is a schematic diagram of still another live streaming page provided in an embodiment of the present disclosure. Similarly, in a case where the objects to be presented belonging to the men's wear category satisfy the first preset condition, the electronic device may also use the men's wear category as the target category, and then present, in the live streaming page, the interaction control 290 corresponding to the men's wear category.

Figure 2E:
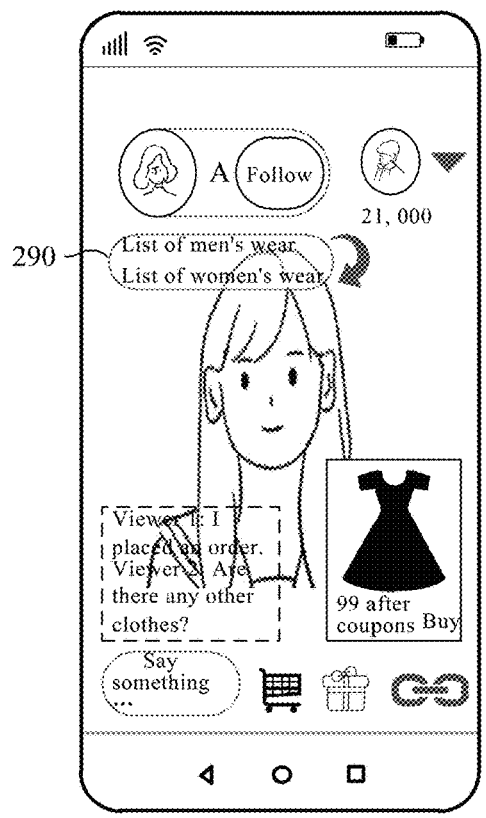
FIG. 2E is a schematic diagram of presenting interaction controls in a carousel manner provided in an embodiment of the present disclosure.

In some embodiments, in a case where the objects to be presented belonging to the men's wear category and the objects to be presented belonging to the women's wear category both satisfy the first preset condition, the electronic device may determine that the target category includes a plurality of categories, such as the men's wear category and the women's wear category. On the basis, the electronic device may present interaction controls of the plurality of categories in the live streaming page in a carousel manner. As shown in FIG. 2E, schematic diagram of presenting interaction controls in a carousel manner provided in an embodiment of the present disclosure. The electronic device may present an interaction control of the men's wear category and an interaction control of the women's wear category in the carousel manner after every certain duration (e.g., 3 seconds). In the embodiments of the present disclosure, dynamic effects of the electronic device for presenting the interaction controls of the plurality of categories in the carousel manner are not limited, for example, may be a page-turning special effect, a sliding special effect, and the like.

It should be noted that the interaction controls of the plurality of categories may be the same control, and when the same control corresponds to different categories, skip links of the interaction control are different; and the interaction controls of the plurality of categories may also be different controls, and the interaction controls of individual ones of the categories correspond to the skip links of the respective categories. Different skip links correspond to different interaction results, for example, the skip link corresponding to the interaction control of the women's wear category may be a list of the women's wear category, and the list includes at least one recommended object of the women's wear category, for example, recommended women's wear.

In some embodiments, the target category may include at least one sub-category, for example, the women's wear category may include women's tops, skirts, women's shoes, and the like; and the men's wear category may include men's tops, men's pants, men's shoes, and the like. Next, a correspondence between the category and sub-categories may be preset, as shown in Table 1 below:

TABLE 1

| Category | Sub-category |
| --- | --- |
| Women's wear | Women's tops, skirts and women's shoes |
| Men's wear | Men's tops, men's pants, men's shoes |

The correspondence between the category and the sub-category shown in Table 1 is merely an exemplary introduction.

Based on the correspondence between the category and the sub-category shown in Table 1, after determining the target category, for example, the determined target category is the women's wear category, the electronic device may obtain sub-categories such as women's tops, skirts, women's shoes, and the like based on the correspondence shown in Table 1. The electronic device may present an interaction control of the at least one sub-category in the live streaming page.

Figure 2F:
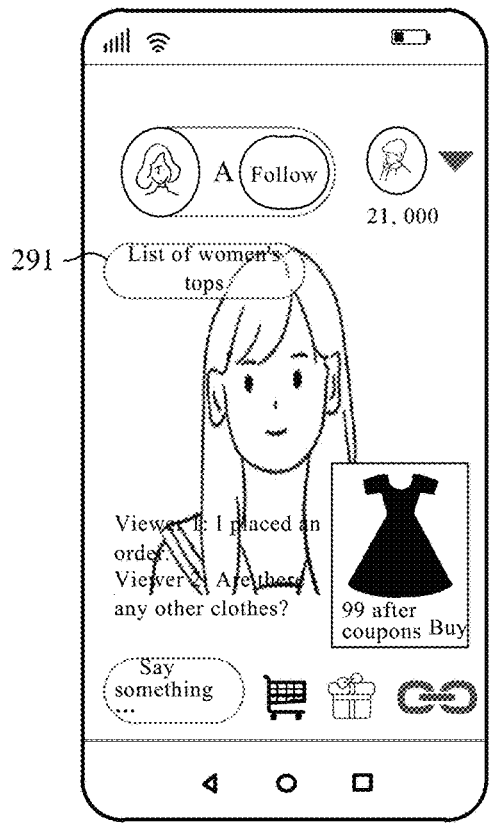
FIG. 2F is a schematic diagram of still another live streaming page provided in an embodiment of the present disclosure.
Figure 2G:
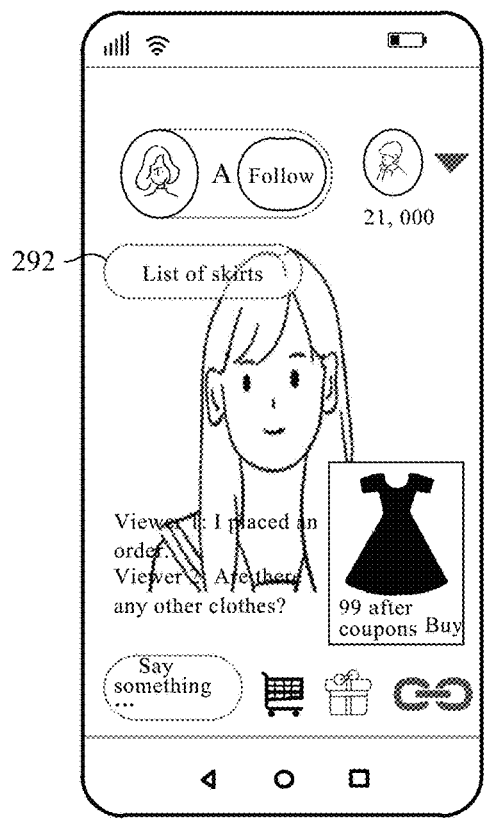
FIG. 2G is a schematic diagram of still another live streaming page provided in an embodiment of the present disclosure.
Figure 2H:
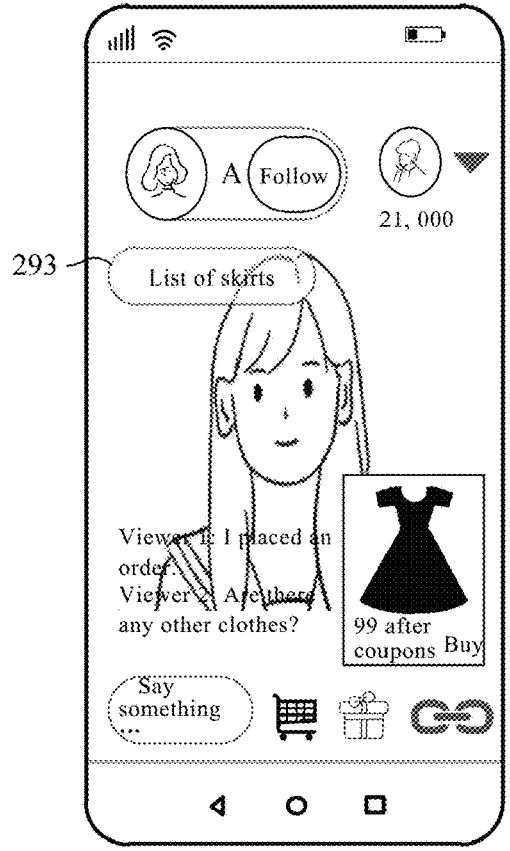
FIG. 2H is a schematic diagram of still another live streaming page provided in an embodiment of the present disclosure.

As shown in FIG. 2F, it is a schematic diagram of still another live streaming page provided in an embodiment of the present disclosure. It can be seen from FIG. 2F that the electronic device presents an interaction control 291 of women's tops in the live streaming page. In some other examples, the electronic device may also present an interaction control 292 of skirts in the live streaming page, or present an interaction control 293 of women's shoes, as shown in FIG. 2G and FIG. 2H, respectively.

Figure 2I:
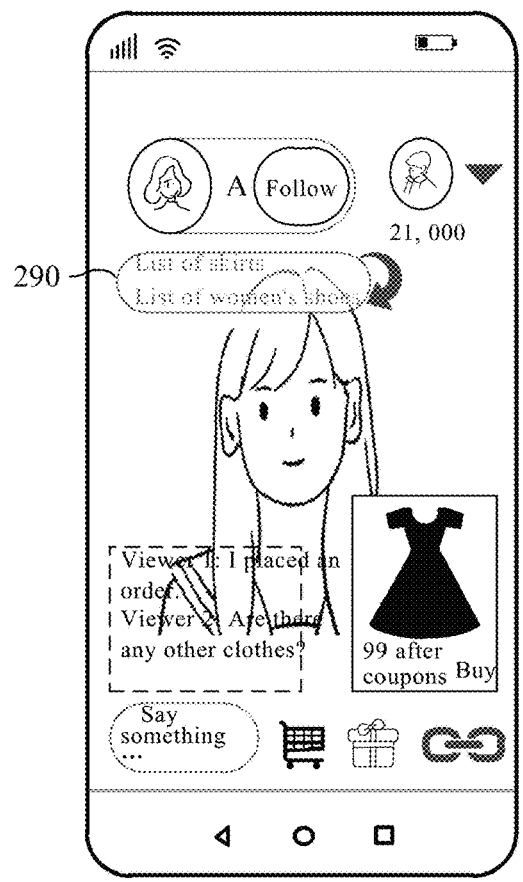
FIG. 2I is another schematic diagram of presenting interaction controls in the carousel manner provided in an embodiment of the present disclosure.

In some embodiments, after determining the plurality of sub-categories of the target category, the electronic device may present interaction controls of the plurality of sub-categories in the live streaming page in the carousel manner. As shown in FIG. 2I, it is another schematic diagram of presenting interaction controls in the carousel manner provided in an embodiment of the present disclosure. Similarly, the electronic device may alternately present the interaction controls of the sub-categories of the women's wear category after every certain duration (e.g., 3 seconds), for example, present the interaction control of women's tops, the interaction control of skirts and the interaction control of women's shoes in the carousel manner.

In some embodiments, after the electronic device presents the interaction control 290 of the objects to be presented in the live streaming page, in a case where it is detected, after every preset duration, that the objects to be presented corresponding to the live streaming page are changed (e.g., the on-sale commodities are changed), the electronic device redetermines whether the changed objects to be presented satisfy the first preset condition; and if so, the electronic device presents, in the live streaming page, an interaction control corresponding to the changed objects to be presented, and if not, the electronic device does not present the interaction control.

For example, in some scenarios, the live streamer may replace the on-sale commodities, for example, replace the on-sale commodities from the commodity 1, the commodity 2 . . . the commodity 10 to a commodity 11, a commodity 12 . . . a commodity 20. The electronic device may detect, after every preset duration (e.g., 3 minutes) whether the on-sale commodities are changed, and upon detecting that the on-sale commodities are changed, the electronic device continues to determine whether the changed on-sale commodities (e.g., the commodity 11 . . . the commodity 20) satisfy the first preset condition; if so, the electronic device presents the interaction control corresponding to the changed on-sale commodities; and if not, the electronic device does not present the interaction control.

S102: in response to a first operation for the interaction control, the electronic device presents a recommendation sub-page in the live streaming page, in which the recommendation sub-page is used for presenting a recommended object corresponding to the objects to be presented.

The first operation may be a click operation, a long-press operation, a sliding operation, or the like. After the electronic device presents the interaction control 290 in the live streaming page, the user may trigger the first operation for the interaction control 290, and then the electronic device may present the recommendation sub-page in the live streaming page in response to the first operation triggered for the interaction control. The recommendation sub-page is used for presenting the recommended object corresponding to the objects to be presented. The recommended object may be the recommended commodity, for example, the recommended object may be other commodity associated with the on-sale commodities. In some examples, the on-sale commodity may include skirts and women's shoes, but do not include pants, and the other commodity associated with the on-sale commodities may be pants, that is, the pants are the recommended object.

Figure 3A:
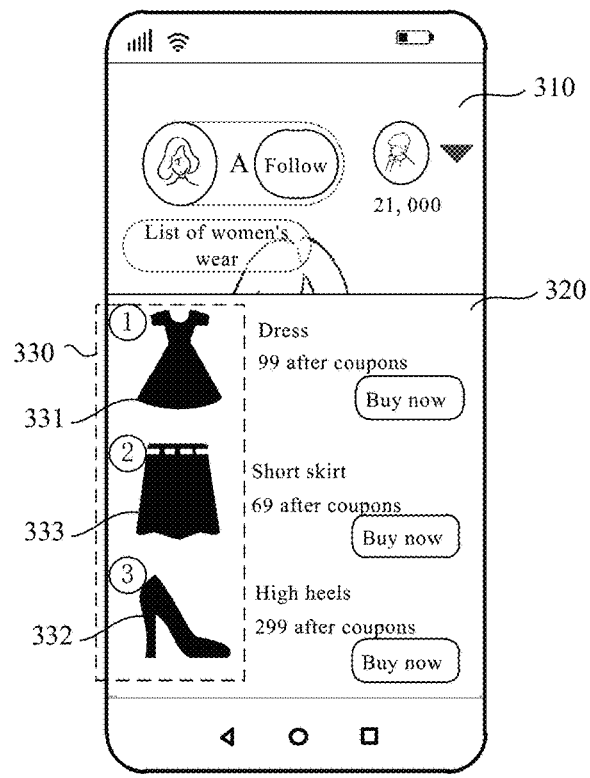
FIG. 3A is a schematic diagram of a recommendation sub-page provided in an embodiment of the present disclosure.

As shown in FIG. 3A, it is a schematic diagram of a recommendation sub-page provided in an embodiment of the present disclosure. The live streaming page may include a video area 310 and an information area 320, the video area 310 is used for presenting a live video, and the information area 320 is used for presenting the recommendation sub-page. The size of the video area 310 and the size of the information area 320 may also be different. For example, the video area 310 occupies ⅓ of the live streaming page and is located above the live streaming page, and the information area 320 occupies ⅔ of the live streaming page and is located below the live streaming page.

Figure 3B:
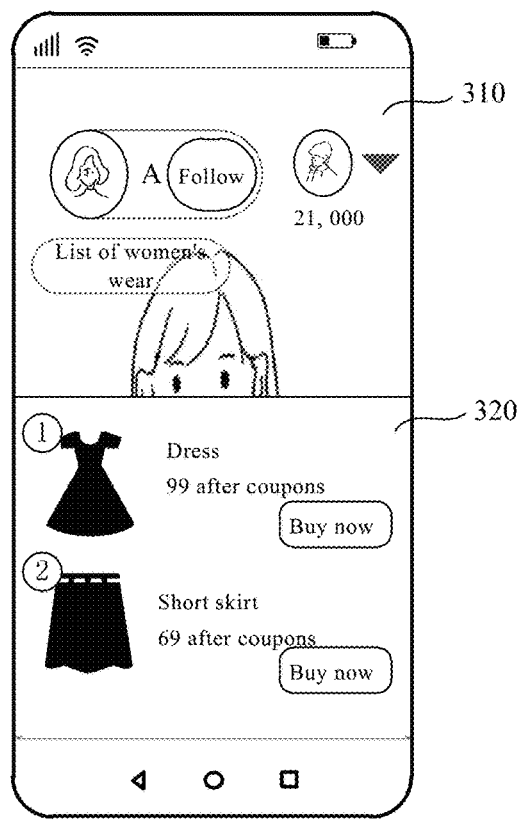
FIG. 3B is a schematic diagram of another recommendation sub-page provided in an embodiment of the present disclosure.

As shown in FIG. 3B, it is a schematic diagram of another recommendation sub-page provided in an embodiment of the present disclosure. The size of the video area 310 and the size of the information area 320 may be the same, for example, the video area 310 and the information area 320 each occupy a half of the live streaming page, the video area 310 is located above the live streaming page, and the information area 320 is located below the live streaming page.

It can be seen that, during the process when the electronic device presents the recommendation sub-page in the information area 320, the video area 310 of the live streaming page also presents the live video, so that the user will not miss the live video of the video area 310 of the live streaming page during the process of purchasing commodities on the recommendation sub-page.

It should be noted that the proportion between the size of the video area 310 and the size of the information area 320 is merely an exemplary introduction, and those skilled in the art may set the proportion between the size of the video area 310 and the size of the information area 320 according to actual needs.

Taking FIG. 3A as an example, popularity information of a recommended object 330 in the recommendation sub-page satisfies a recommendation condition, the popularity information of the recommended object 330 may be at least one of a sales volume of the recommended object 330, a collection volume of the recommended object 330, and a shopping cart add volume of the recommended object 330.

In some examples, the popularity information of the recommended object 330 may be the sales volume of the recommended object 330, and then the popularity information of the recommended object 330 satisfying the recommendation condition may be that the sales volume of the recommended object 330 is greater than a preset sales volume, for example, a monthly sales volume is greater than 500. Of course, the popularity information of the recommended object 330 satisfying the recommendation condition may be that the ranking of the sales volume of the recommended object 330 is greater than a preset ranking, for example, the ranking of the sales volume is top 5.

In some other examples, the popularity information of the recommended object 330 may be the collection volume of the recommended object 330, and then the popularity information of the recommended object 330 satisfying the recommendation condition may be that the collection volume of the recommended object 330 is greater than a preset collection volume, for example, the collection volume is greater than 5000.

In some other examples, the popularity information of the recommended object 330 may be the shopping cart add volume of the recommended object 330, and then the popularity information of the recommended object 330 satisfying the recommendation condition may be that the shopping cart add volume of the recommended object 330 is greater than a preset shopping cart add volume, for example, the shopping cart add volume is greater than 6000.

Of course, the popularity information of the recommended object 330 may also be a plurality of combinations of the sales volume, the collection volume and the shopping cart add volume. For example, the popularity information of the recommended object 330 may be characterized by the sales volume and the collection volume, at this time, the popularity information of the recommended object 330 satisfying the recommendation condition may be that the sales volume of the recommended object 330 is greater than the preset sales volume, and the collection volume of the recommended object 330 is greater than the preset collection volume.

It should be noted that, the above description is merely an exemplary introduction of the popularity information of the recommended object 300 satisfying the recommendation condition, and those skilled in the art may determine the popularity information of the recommended object 300 and the corresponding recommendation condition according to actual needs.

With continued reference to FIG. 3A, the recommendation sub-page may include a plurality of recommended objects 330, such as a first recommended object 331, a second recommended object 332, a third recommended object 333, and the like. In the recommendation sub-page, each recommended object 330 may be sorted based on the popularity of the plurality of recommended objects 330, for example, the higher the popularity of the recommended object is, the higher the ranking of the recommended object is. Of course, the recommended objects may also be sorted based on association degrees between the plurality of recommended objects 330 and the objects to be presented, for example, the higher the association degree of the recommended object is, the higher the ranking of the recommended object is.

In some examples, the recommended objects 330 presented in the recommendation sub-page may include an object in the objects to be presented and an object other than the objects to be presented. For example, the first recommended object 331 may be the commodity 1 (e.g., a dress) in the on-sale commodities, the second recommended object 332 is not a commodity in the on-sale commodities, and the third recommended object 333 may be a commodity 3 (e.g., a short skirt) in the on-sale commodities.

In one sorting manner, since the first recommended object 331 and the third recommended object 333 are commodities in the on-sale commodities, the first recommended object 331 and the third recommended object 333 may be ranked first, and the second recommended object 332 is ranked behind. For the first recommended object 331 and the third recommended object 333, the recommended object with high popularity may be ranked first, for example, the popularity of the first recommended object 331 is higher than that of the third recommended object 333, so that the final ranking obtained at this time is: the first recommended object 331, the third recommended object 333 and the second recommended object 332.

In another sorting manner, sorting may be performed based on the popularity of the first recommended object 331, the second recommended object 332 and the third recommended object 333 in the whole platform (e.g., an online mall). For example, the popularity of the second recommended object 332 is higher than that of the first recommended object 331, and the popularity of the first recommended object 331 is higher than that of the third recommended object 333, so that the final ranking obtained at this time is: the second recommended object 332, the first recommended object 331 and the third recommended object 333.

The sorting manner of the plurality of recommended objects 330 is not limited in the present disclosure, and those skilled in the art may set a display sequence of the plurality of recommended objects 330 in the recommendation sub-page according to actual needs.

In the recommendation method provided in the embodiments of the present disclosure, during the process of viewing a live stream, the user may view, in the recommendation sub-page of the live streaming page, the recommended objects associated with the objects to be presented by triggering the first operation via the interaction control. It can be seen that there is no need for the user to exit the live streaming room and then search for the recommended objects, thereby simplifying user operations, meeting user requirements and improving user experience.

In the recommendation method provided in the embodiments of the present disclosure, the user is also supported to quickly skip from the recommendation sub-page to a page of the online mall, and there is no need for the user to exit the live streaming room, thereby simplifying the user operations. Specifically, the recommendation method further includes the following:

S103: the electronic device presents a skip control in the recommendation sub-page.

Figure 4:
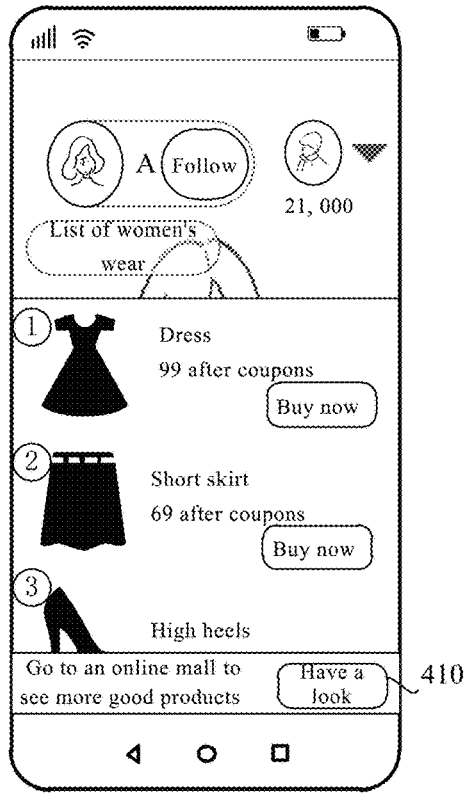
FIG. 4 is a schematic diagram of still another recommendation sub-page provided in an embodiment of the present disclosure.

As show in FIG. 4, it is a schematic diagram of still another recommendation sub-page provided in an embodiment of the present disclosure. In some embodiments, after presenting the recommendation sub-page, the electronic device may directly present the skip control 410, or the electronic device may present the skip control 410 on the recommendation sub-page in a case where a second preset condition is satisfied. The second preset condition may be at least one of the following: it is detected that a sliding distance for the recommendation sub-page is greater than a third preset threshold value, it is detected that the number of times of sliding for the recommendation sub-page is greater than a fourth preset threshold value, or it is detected that a stay duration on the recommendation sub-page is greater than a fifth preset threshold value.

For example, the second preset condition may be that it is detected that the sliding distance for the recommendation sub-page is greater than the third preset threshold value, the third preset threshold value may be a distance threshold value, and when it is detected that the sliding distance for the recommendation sub-page is greater than the distance threshold value, the electronic device presents the skip control 410 on the recommendation sub-page. As another example, the second preset condition may be that it is detected that the number of times of sliding for the recommendation sub-page is greater than the fourth preset threshold value, the fourth preset threshold value may be a threshold value of the number of times, and when it is detected that the number of times of sliding for the recommendation sub-page is greater than the threshold value of the number of times, the electronic device presents the skip control 410 on the recommendation sub-page. As another example, the second preset condition may be that it is detected that the stay duration on the recommendation sub-page is greater than the fifth preset threshold value, the fifth preset threshold value may be a duration threshold value, and when it is detected that the stay duration on the recommendation sub-page is greater than the duration threshold value, the electronic device presents the skip control 410 on the recommendation sub-page. Of course, the second preset condition may also include a combination of the plurality of conditions.

It should be noted that the skip control 410 shown in FIG. 4 is merely an exemplary introduction. In some embodiments, the skip control 410 may be located above the recommendation sub-page, or may be located at a geometric center of the recommendation sub-page.

S104: the electronic device presents a target page corresponding to the skip control in response to a second operation for the skip control.

Figure 5:
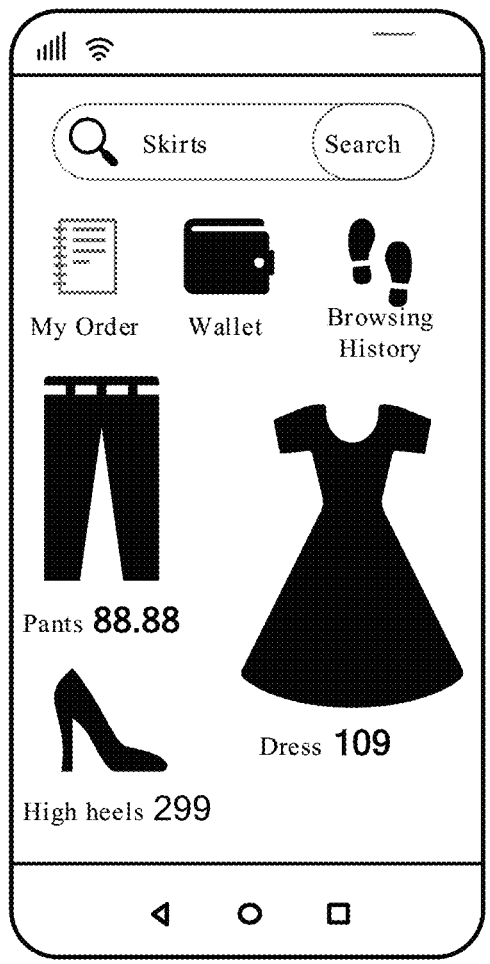
FIG. 5 is a schematic diagram of a target page provided in an embodiment of the present disclosure.

After the electronic device presents the skip control 410 in the recommendation sub-page, the user may trigger the second operation for the skip control 410, and the second operation may be a click operation, a long-press operation, a sliding operation, or the like; and then the electronic device presents the target page corresponding to the skip control in response to the second operation for the skip control. As shown in FIG. 5, it is a schematic diagram of the target page provided in an embodiment of the present disclosure. The target page may be a page of the online mall, and after the electronic device presents the page of the online mall, the user may directly perform online shopping on the page of the online mall without performing operations such as exiting the live streaming room, thereby meeting user requirements and improving user experience.

It should be noted that S103 and S104 are optional steps, and S103 and S104 may not be executed in some embodiments.

Based on the description of the above content, the embodiments of the present disclosure provide a recommendation method. In the method, during the process of viewing a live stream, the electronic device may recommend, to the user based on the first operation for the interaction control, other commodities associated with the on-sale commodities, thereby achieving a complementary effect with the on-sale commodities in the live streaming room. Moreover, the user may view the other commodities associated with the on-sale commodities without exiting the live streaming room, thereby simplifying user operations, meeting user requirements and improving user experience. Further, the skip control for quickly entering the online mall in the live streaming room is provided on the recommendation sub-page, and the electronic device may skip to the page of the online mall in response to the second operation for the skip control, thereby further improving the shopping experience of the user.

Figure 6:
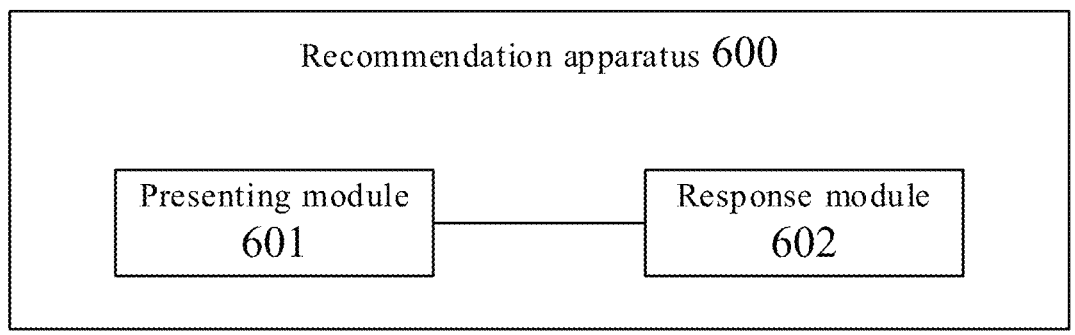
FIG. 6 is a schematic diagram of a recommendation apparatus provided in an embodiment of the present disclosure.

Referring to FIG. 6, it is a schematic diagram of a recommendation apparatus provided in an embodiment of the present disclosure, and as shown in FIG. 6, the recommendation apparatus 600 includes a presenting module 601 and a response module 602.

The presenting module 601 is configured to: in a case where objects to be presented corresponding to a live streaming page satisfy a first preset condition, present, in the live streaming page, an interaction control corresponding to the objects to be presented; and The response module 602 is configured to: in response to a first operation for the interaction control, present a recommendation sub-page in the live streaming page. The recommendation sub-page is used for presenting a recommended object corresponding to the objects to be presented.

Optionally, the first preset condition includes the following: the proportion and/or the number of objects to be presented belonging to the same category in the objects to be presented corresponding to the live streaming page is greater than a first preset threshold value, and the number of the objects to be presented corresponding to the live streaming page is greater than a second preset threshold value; or, the proportion and/or the number of objects to be presented belonging to the same category in the objects to be presented corresponding to the live streaming page is greater than the first preset threshold value.

Optionally, the presenting module 601 is specifically configured to determine that the category corresponding to the objects to be presented belonging to the same category is a target category; and present an interaction control of the target category in the live streaming page.

Optionally, the target category includes a plurality of categories, and the presenting module 601 is specifically configured to present interaction controls of the plurality of categories in the live streaming page in a carousel manner.

Optionally, the target category includes at least one sub-category; the presenting module 601 is specifically configured to determine at least one sub-category corresponding to the target category according to a preset correspondence between a category and sub-categories, and the target category; and present an interaction control of the at least one sub-category in the live streaming page.

Optionally, the presenting module 601 is specifically configured to present interaction controls of a plurality of sub-categories in the live streaming page in the carousel manner.

Optionally, popularity information of the recommended object satisfies a recommendation condition, and the popularity information of the recommended object includes at least one of the following: a sales volume of the recommended object, a collection volume of the recommended object, and a shopping cart add volume of the recommended object.

Optionally, the live streaming page includes a video area and an information area, and the presenting module 601 is specifically configured to present the recommendation sub-page in the information area.

Optionally, the presenting module 601 is further configured to present a skip control in the recommendation sub-page; and the response module 602 is further configured to: in response to a second operation for the skip control, present a target page corresponding to the skip control.

Optionally, the presenting module 601 is specifically configured to: in a case where a second preset condition is satisfied, present the skip control in the recommendation sub-page, wherein the second preset condition includes at least one of the following: it is detected that a sliding distance for the recommendation sub-page is greater than a third preset threshold value; it is detected that the number of times of sliding for the recommendation sub-page is greater than a fourth preset threshold value; or it is detected that a stay duration on the recommendation sub-page is greater than a fifth preset threshold value.

Optionally, the apparatus further includes a detection module, configured to: in a case where it is detected, after every preset duration, that the objects to be presented corresponding to the live streaming page are changed, determine whether the changed objects to be presented satisfy the first preset condition; and the presenting module 601 is further configured to: in a case where the changed objects to be presented satisfy the first preset condition, present, in the live streaming page, the interaction control corresponding to the changed objects to be presented; and otherwise, not present the interaction control.

Functions of the foregoing modules are described in detail in the steps of the method in the foregoing embodiment, and thus details are not described herein again.

Hereinafter, referring to FIG. 7, it illustrates a schematic structural diagram of an electronic device 700 suitable for implementing the embodiments of the present application. The electronic device is used for implementing functions corresponding to the recommendation apparatus 600 as shown in FIG. 6. The electronic device shown in FIG. 7 is merely an example, and should not bring any limitation to the functions and use ranges of the embodiments of the present disclosure.

Figure 7:
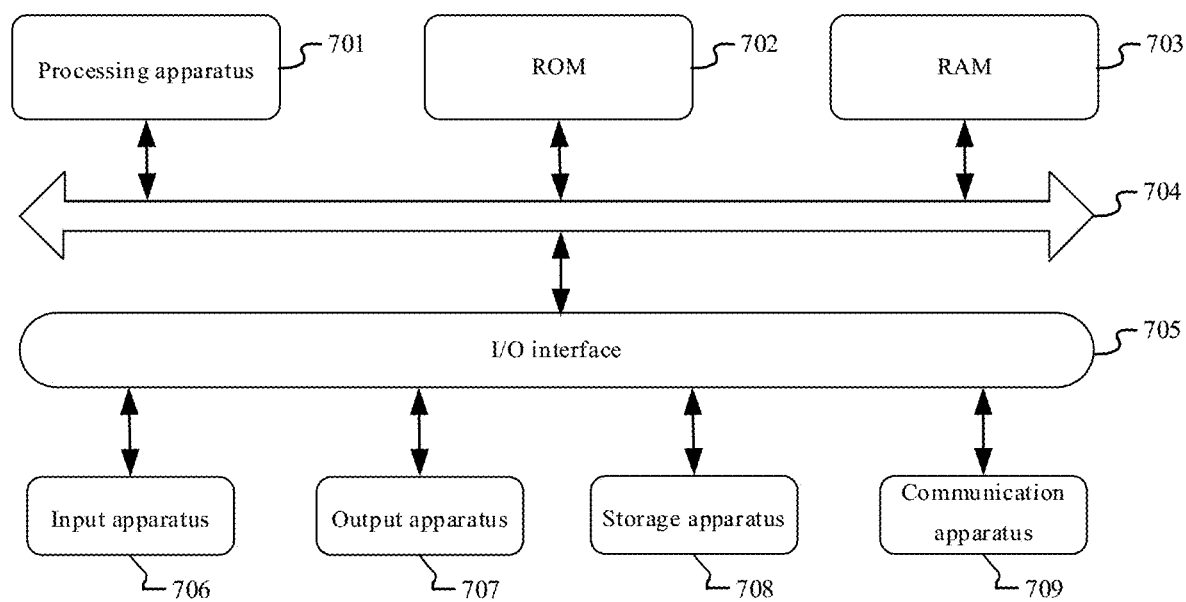
FIG. 7 is a schematic structural diagram of an electronic device provided in an embodiment of the present disclosure.

As shown in FIG. 7, the electronic device 700 may include a processing apparatus (e.g., a central processing unit, a graphics processing unit, or the like) 701, which may execute various suitable actions and processes according to a program stored in a read-only memory (ROM) 702 or a program loaded from a storage apparatus 708 into a random access memory (RAM) 703. In the RAM 703, various programs and data needed by the operations of the electronic device 700 are also stored. The processing apparatus 701, the ROM 702 and the RAM 703 are connected with each other via a bus 704. An input/output (I/O) interface 705 is also connected to the bus 704.

In general, the following apparatuses may be connected to the I/O interface 705: an input apparatus 706, including, for example, a touch screen, a touch pad, a keyboard, a mouse, a camera, a microphone, an accelerometer, a gyroscope, and the like; an output apparatus 707, including, for example, a liquid crystal display (LCD), a speaker, a vibrator, and the like; a storage apparatus 708, including, for example, a magnetic tape, a hard disk, and the like; and a communication apparatus 709. The communication apparatus 709 may allow the electronic device 700 to communicate in a wireless or wired manner with other devices to exchange data. Although FIG. 7 illustrates the electronic device 700 having various apparatuses, it should be understood that not all illustrated apparatuses are required to be implemented or provided. More or fewer apparatuses may alternatively be implemented or provided.

In particular, according to the embodiments of the present disclosure, the processes described above with reference to the flowcharts may be implemented as computer software programs. For example, the embodiments of the present disclosure include a computer program product, which includes a computer program carried on a non-transitory computer-readable medium, and the computer program contains program codes for executing the method illustrated in the flowcharts. In such embodiments, the computer program may be downloaded and installed from a network via the communication apparatus 709, or installed from the storage apparatus 708, or installed from the ROM 702. When the computer program is executed by the processing apparatus 701, the above functions defined in the method provided in the embodiments of the present disclosure are executed.

It should be noted that, the computer-readable medium described above in the present disclosure may be either a computer-readable signal medium or a computer-readable storage medium, or any combination of the two. The computer-readable storage medium may be, for example, but is not limited to, an electrical, magnetic, optical, electromagnetic, infrared, or semiconductor system, apparatus or device, or a combination of any of the above. More specific examples of the computer-readable storage medium may include, but are not limited to: an electrical connection having one or more wires, a portable computer magnetic disk, a hard disk, a random access memory (RAM), a read-only memory (ROM), an erasable programmable read-only memory (EPROM or a flash memory), an optical fiber, a compact disc read-only memory (CD-ROM), an optical storage device, a magnetic storage device, or any suitable combination of the above. In the present disclosure, the computer-readable storage medium may be any tangible medium that contains or stores a program, wherein the program may be used by or in combination with an instruction execution system, apparatus or device. In the present disclosure, the computer-readable signal medium may include a data signal that is propagated in a baseband or used as part of a carrier, wherein the data signal carries computer-readable program codes. Such propagated data signal may take many forms, including, but not limited to, electromagnetic signals, optical signals, or any suitable combination thereof. The computer-readable signal medium may also be any computer-readable medium other than the computer-readable storage medium, and the computer-readable signal medium may send, propagate or transport the program for use by or in combination with the instruction execution system, apparatus or device. Program codes contained on the computer-readable medium may be transmitted with any suitable medium, including, but not limited to: an electrical wire, an optical cable, RF (radio frequency), and the like, or any suitable combination thereof.

In some implementations, a client and a server may perform communication by using any currently known or future-developed network protocol, such as an HTTP (HyperText Transfer Protocol), and may be interconnected with any form or medium of digital data communication (e.g., a communication network). Examples of the communication network include a local area network ("LAN"), a wide area network ("WAN"), an international network (e.g., the Internet), and a peer-to-peer network (e.g., an ad hoc peer-to-peer network), as well as any currently known or future-developed network.

The computer-readable medium may be contained in the above electronic device; and it may also be present separately and is not assembled into the electronic device.

The computer-readable medium carries one or more programs that, when executed by the electronic device, cause the electronic device to: in a case where objects to be presented corresponding to a live streaming page satisfy a first preset condition, present, in the live streaming page, an interaction control corresponding to the objects to be presented; and in response to a first operation for the interaction control, present a recommendation sub-page in the live streaming page, wherein the recommendation sub-page is used for presenting recommended objects corresponding to the objects to be presented.

Computer program codes for executing the operations of the present disclosure may be written in one or more programming languages or combinations thereof. The programming languages include, but are not limited to, object-oriented programming languages, such as Java, Smalltalk, C++, and conventional procedural programming languages, such as the "C" language or similar programming languages. The program codes may be executed entirely on a user computer, executed partly on the user computer, executed as a stand-alone software package, executed partly on the user computer and partly on a remote computer, or executed entirely on the remote computer or the server. In the case involving the remote computer, the remote computer may be connected to the user computer through any type of network, including a local area network (LAN) or a wide area network (WAN), or it may be connected to an external computer (e.g., through the Internet using an Internet service provider).

The flowcharts and block diagrams in the drawings illustrate system architectures, functions and operations of possible implementations of systems, methods and computer program products according to various embodiments of the present disclosure. In this regard, each block in the flowcharts or block diagrams may represent a part of a module, a program segment or a code, and the part of the module, the program segment or the code contains one or more executable instructions for implementing specified logic functions. It should also be noted that, in some alternative implementations, the functions annotated in the blocks may occur out of the sequence annotated in the drawings. For example, two blocks shown in succession may, in fact, be executed substantially concurrently, or the blocks may sometimes be executed in a reverse sequence, depending upon the functions involved. It should also be noted that each block in the block diagrams and/or flowcharts, and combinations of the blocks in the block diagrams and/or flowcharts may be implemented by dedicated hardware-based systems for executing specified functions or operations, or combinations of dedicated hardware and computer instructions.

The modules involved in the described embodiments of the present disclosure may be implemented in a software or hardware manner. The names of the modules do not constitute limitations of the modules themselves in a certain case. For example, a first acquisition module may be described as a "module for acquiring at least two internet protocol addresses".

The functions described herein above may be executed, at least in part, by one or more hardware logic components. For example, without limitation, example types of the hardware logic components that may be used include: a field programmable gate array (FPGA), an application specific integrated circuit (ASIC), an application specific standard product (ASSP), a system on chip (SOC), a complex programmable logic device (CPLD), and so on.

In the context of the present disclosure, a machine-readable medium may be a tangible medium, which may contain or store a program for use by or in combination with the instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination thereof. More specific examples of the machine-readable storage medium would include an electrical connection based on one or more wires, a portable computer disk, a hard disk, a random access memory (RAM), a read-only memory (ROM), an erasable programmable read-only memory (EPROM or a flash memory), an optical fiber, a compact disc read-only memory (CD-ROM), an optical storage device, a magnetic storage device, or any suitable combination thereof.

According to one or more embodiments of the present disclosure, example 1 provides a recommendation method, including:
  in a case where objects to be presented corresponding to a live streaming page satisfy a first preset condition, presenting, in the live streaming page, an interaction control corresponding to the objects to be presented; and
  in response to a first operation for the interaction control, presenting a recommendation sub-page in the live streaming page, wherein the recommendation sub-page is used for presenting a recommended object corresponding to the objects to be presented.

According to one or more embodiments of the present disclosure, example 2 provides the method in example 1, the first preset condition includes the following conditions that:
  a proportion and/or a number of objects to be presented belonging to the same category in the objects to be presented corresponding to the live streaming page is greater than a first preset threshold value, and the number of the objects to be presented corresponding to the live streaming page is greater than a second preset threshold value; or,
  a proportion and/or a number of objects to be presented belonging to the same category in the objects to be presented corresponding to the live streaming page is greater than the first preset threshold value.

According to one or more embodiments of the present disclosure, example 3 provides the method in example 2, presenting, in the live streaming page, the interaction control corresponding to the objects to be presented includes:
  determining that a category corresponding to the objects to be presented belonging to the same category is a category; and
  presenting an interaction control of the target category in the live streaming page.

According to one or more embodiments of the present disclosure, example 4 provides the method in example 3, the target category includes a plurality of categories, and presenting the interaction control of the target category in the live streaming page includes:
  presenting interaction controls of the plurality of categories in the live streaming page in a carousel manner.

According to one or more embodiments of the present disclosure, example 5 provides the method in example 3, the target category includes at least one sub-category; and presenting the interaction control of the target category in the live streaming page, includes:
  determining at least one sub-category corresponding to the target category according to a preset correspondence between a category and a sub-category, and the target category; and
  presenting an interaction control of the at least one sub-category in the live streaming page.

According to one or more embodiments of the present disclosure, example 6 provides the method in example 5, presenting the interaction control of the at least one sub-category in the live streaming page includes:
  presenting interaction controls of a plurality of sub-categories in the live streaming page in the carousel manner.

According to one or more embodiments of the present disclosure, example 7 provides the method in examples 1-6, popularity information of the recommended object satisfies a recommendation condition, and the popularity information of the recommended object includes at least one of the following:
  a sales volume of the recommended object, a collection volume of the recommended object, and a shopping cart add volume of the recommended object.

According to one or more embodiments of the present disclosure, example 8 provides the method in examples 1-7, the live streaming page includes a video area and an information area, and presenting the recommendation sub-page in the live streaming page, includes:
  presenting the recommendation sub-page in the information area.

According to one or more embodiments of the present disclosure, example 9 provides the method in examples 1-8, the method further includes: after presenting the recommendation sub-page in the live streaming page,
  presenting a skip control in the recommendation sub-page; and
  in response to a second operation for the skip control, presenting a target page corresponding to the skip control.

According to one or more embodiments of the present disclosure, example 10 provides the method in example 9, presenting the skip control in the recommendation sub-page, includes:
  in a case where a second preset condition is satisfied, presenting the skip control in the recommendation sub-page, wherein the second preset condition includes at least one of the following:
    it is detected that a sliding distance for the recommendation sub-page is greater than a third preset threshold value;
    it is detected that a number of times of sliding for the recommendation sub-page is greater than a fourth preset threshold value; or
    it is detected that a stay duration on the recommendation sub-page is greater than a fifth preset threshold value.

According to one or more embodiments of the present disclosure, example 11 provides the method in examples 1-10, the method further includes: after presenting, in the live streaming page, the interaction control corresponding to the objects to be presented,
  in a case where it is detected, after every preset duration, that the objects to be presented corresponding to the live streaming page are changed, determining whether the changed objects to be presented satisfy the first preset condition;

if so, presenting, in the live streaming page, an interaction control corresponding to the changed objects to be presented; and if not, not presenting the interaction control.

What have been described above are only preferred embodiments of the present disclosure and illustrations of the technical principles employed. It should be understood by those skilled in the art that, the disclosure scope involved in the preset disclosure is not limited to the technical solutions formed by specific combinations of the above technical features, and meanwhile should also include other technical solutions formed by any combinations of the above technical features or equivalent features thereof without departing from the concept of the disclosure, for example, technical solutions formed by mutual replacement of the above features with technical features having similar functions disclosed in the present disclosure (but is not limited to).

In addition, although various operations are described in a particular order, this should not be understood as requiring that these operations are executed in the particular sequence shown or in a sequential order. In certain environments, multitasking and parallel processing may be advantageous. Similarly, although several specific implementation details have been contained in the above discussion, these should not be construed as limiting the scope of the present disclosure. Some features that are described in the context of separate embodiments may also be implemented in combination in a single embodiment. Conversely, various features that are described in the context of a single embodiment may also be implemented in a plurality of embodiments separately or in any suitable sub-combination.

Although the present theme has been described in language specific to structural features and/or methodological actions, it should be understood that the theme defined in the appended claims is not necessarily limited to the specific features or actions described above. Rather, the specific features and actions described above are merely example forms of implementing the claims. Regarding the apparatus in the above embodiments, the specific manner in which each module executes operations have been described in detail in the embodiments related to the method, and thus details are not repeated herein again.

The invention claimed is:

1. A live streaming object recommendation method, comprising:
   in a case where objects to be presented corresponding to a live streaming page satisfy a first preset condition, presenting, in the live streaming page, an interaction control corresponding to the objects to be presented; and
   in response to a first operation for the interaction control, presenting a recommendation sub-page in the live streaming page, wherein the recommendation sub-page is used for presenting a recommended object corresponding to the objects to be presented, and the recommended object does not belong to the live streaming page, and the recommendation sub-page comprises a plurality of recommended objects, and the plurality of recommended objects are sorted based on popularity information of the plurality of recommended objects and displayed in the recommendation sub-page,
   wherein the first preset condition comprises following conditions that:
      at least one of a proportion or a number of objects to be presented belonging to a same category in the objects to be presented corresponding to the live streaming page is greater than a first preset threshold value, and the number of the objects to be presented corresponding to the live streaming page is greater than a second preset threshold value; or
      at least one of a proportion or a number of objects to be presented belonging to a same category in the objects to be presented corresponding to the live streaming page is greater than the first preset threshold value.

2. The method according to claim 1, wherein presenting, in the live streaming page, the interaction control corresponding to the objects to be presented comprises:
   determining that the category corresponding to the objects to be presented belonging to the same category is a target category; and
   presenting an interaction control of the target category in the live streaming page.

3. The method according to claim 2, wherein the target category comprises a plurality of categories, and presenting the interaction control of the target category in the live streaming page comprises:
   presenting interaction controls of the plurality of categories in the live streaming page in a carousel manner.

4. The method according to claim 2, wherein the target category comprises at least one sub-category; and presenting the interaction control of the target category in the live streaming page comprises:
   determining at least one sub-category corresponding to the target category according to a preset correspondence between a category and a sub-category, and the target category; and
   presenting an interaction control of the at least one sub-category in the live streaming page.

5. The method according to claim 4, wherein presenting the interaction control of the at least one sub-category in the live streaming page comprises:
   presenting interaction controls of a plurality of sub-categories in the live streaming page in a carousel manner.

6. The method according to claim 1, wherein popularity information of the recommended object satisfies a recommendation condition, and the popularity information of the recommended object comprises at least one of the following:
   a sales volume of the recommended object, a collection volume of the recommended object, and a shopping cart add volume of the recommended object.

7. The method according to claim 1, wherein the live streaming page comprises a video area and an information area, and presenting the recommendation sub-page in the live streaming page comprises:
   presenting the recommendation sub-page in the information area.

8. The method according to claim 1, wherein the method further comprises:
   after presenting the recommendation sub-page in the live streaming page,
      presenting a skip control in the recommendation sub-page; and
      in response to a second operation for the skip control, presenting a target page corresponding to the skip control.

9. The method according to claim 8, wherein presenting the skip control in the recommendation sub-page comprises:
   in a case where a second preset condition is satisfied, presenting the skip control in the recommendation sub-page, wherein the second preset condition comprises at least one of the following:

21 it is detected that a sliding distance for the recommendation sub-page is greater than a third preset threshold value;

it is detected that a number of times of sliding for the recommendation sub-page is greater than a fourth preset threshold value; or it is detected that a stay duration on the recommendation sub-page is greater than a fifth preset threshold value.

10. The method according to claim 1, wherein the method further comprises: after presenting, in the live streaming page, the interaction control corresponding to the objects to be presented, in a case where it is detected, after every preset duration, that the objects to be presented corresponding to the live streaming page are changed, determining whether the changed objects to be presented satisfy the first preset condition;

if so, presenting, in the live streaming page, an interaction control corresponding to the changed objects to be presented; and if not, not presenting the interaction control.

11. An electronic device, comprising:

a storage apparatus, storing a computer program thereon; and a processing apparatus, configured to execute the computer program in the storage apparatus, so as to be caused to:

in a case where objects to be presented corresponding to a live streaming page satisfy a first preset condition, present, in the live streaming page, an interaction control corresponding to the objects to be presented; and in response to a first operation for the interaction control, present a recommendation sub-page in the live streaming page, wherein the recommendation sub-page is used for presenting a recommended object corresponding to the objects to be presented, and the recommended object does not belong to the live streaming page, and the recommendation sub-page comprises a plurality of recommended objects, and the plurality of recommended objects are sorted based on popularity information of the plurality of recommended objects and displayed in the recommendation sub-page, wherein the first preset condition comprises following conditions that:

at least one of a proportion or a number of objects to be presented belonging to a same category in the objects to be presented corresponding to the live streaming page is greater than a first preset threshold value, and the number of the objects to be presented corresponding to the live streaming page is greater than a second preset threshold value; or at least one of a proportion or a number of objects to be presented belonging to a same category in the objects to be presented corresponding to the live streaming page is greater than the first preset threshold value.

12. The electronic device according to claim 11, wherein the processing apparatus is caused to present, in the live streaming page, the interaction control corresponding to the objects to be presented by being caused to:

determine that the category corresponding to the objects to be presented belonging to the same category is a target category; and

22 present an interaction control of the target category in the live streaming page.

13. The electronic device according to claim 12, wherein the target category comprises a plurality of categories, and the processing apparatus is caused to present the interaction control of the target category in the live streaming page by being caused to:

present interaction controls of the plurality of categories in the live streaming page in a carousel manner.

14. The electronic device according to claim 12, wherein the target category comprises at least one sub-category; and the processing apparatus is caused to present the interaction control of the target category in the live streaming page by being caused to:

determine at least one sub-category corresponding to the target category according to a preset correspondence between a category and a sub-category, and the target category; and present an interaction control of the at least one sub-category in the live streaming page.

15. The electronic device according to claim 14, wherein the processing apparatus is caused to present the interaction control of the at least one sub-category in the live streaming page by being caused to:

present interaction controls of a plurality of sub-categories in the live streaming page in a carousel manner.

16. The electronic device according to claim 11, wherein popularity information of the recommended object satisfies a recommendation condition, and the popularity information of the recommended object comprises at least one of the following:

a sales volume of the recommended object, a collection volume of the recommended object, and a shopping cart add volume of the recommended object.

17. The electronic device according to claim 11, wherein the live streaming page comprises a video area and an information area, and the processing apparatus is caused to present the recommendation sub-page in the live streaming page by being caused to:

present the recommendation sub-page in the information area.

18. A non-transitory computer-readable storage medium, storing a computer program thereon, wherein the program implements, when executed by a processing apparatus:

in a case where objects to be presented corresponding to a live streaming page satisfy a first preset condition, presenting, in the live streaming page, an interaction control corresponding to the objects to be presented; and in response to a first operation for the interaction control, presenting a recommendation sub-page in the live streaming page, wherein the recommendation sub-page is used for presenting a recommended object corresponding to the objects to be presented, and the recommended object does not belong to the live streaming page, and the recommendation sub-page comprises a plurality of recommended objects, and the plurality of recommended objects are sorted based on popularity information of the plurality of recommended objects and displayed in the recommendation sub-page, wherein the first preset condition comprises following conditions that:

at least one of a proportion or a number of objects to be presented belonging to a same category in the objects to be presented corresponding to the live streaming page is greater than a first preset threshold value, and the number of the objects to be presented corresponding to the live streaming page is greater than a second preset threshold value; or at least one of a proportion or a number of objects to be presented belonging to a same category in the objects to be presented corresponding to the live streaming page is greater than the first preset threshold value.

\* \* \* \* \*